United States Patent [19]
Whitlock

[11] 3,910,052
[45] Oct. 7, 1975

[54] IRRIGATION CANAL, WATER-WITHDRAWAL WEIR

[76] Inventor: Carrol G. Whitlock, 841 Grand Dr., Moses Lake, Wash. 98837

[22] Filed: Feb. 21, 1974

[21] Appl. No.: 444,536

[52] U.S. Cl. .................................. 61/12; 61/14
[51] Int. Cl.² .................................. E02B 13/00
[58] Field of Search ................ 61/12, 13, 29, 14

[56] References Cited
UNITED STATES PATENTS

| | | | |
|---|---|---|---|
| 1,277,332 | 8/1918 | McNutt | 61/12 |
| 1,528,421 | 3/1925 | Hayes | 61/12 |
| 1,865,769 | 7/1932 | Lanz | 61/12 |
| 3,630,034 | 12/1971 | Whitlock | 61/12 |

Primary Examiner—Paul R. Gilliam
Assistant Examiner—David H. Corbin

[57] ABSTRACT

To withdraw water from an irrigation canal or head ditch for distribution to a plurality of field corrugations, a weir is installed in the canal to contain a bifurcated water check or dam pointed downstream of the water flow in the canal. The bifurcated water check or dam forms an upstream pool of water to be withdrawn and distributed to the corrugations. The weir includes a valved outlet adjacent the upstream portion of the bifurcated dam, and outflowing water from said pool is conducted to a distributor conduit extending generally parallel alongside the canal at the head ends of said corrugations. The conduit includes a tube for each corrugation to conduct water from within said conduit to the corrugations.

6 Claims, 6 Drawing Figures

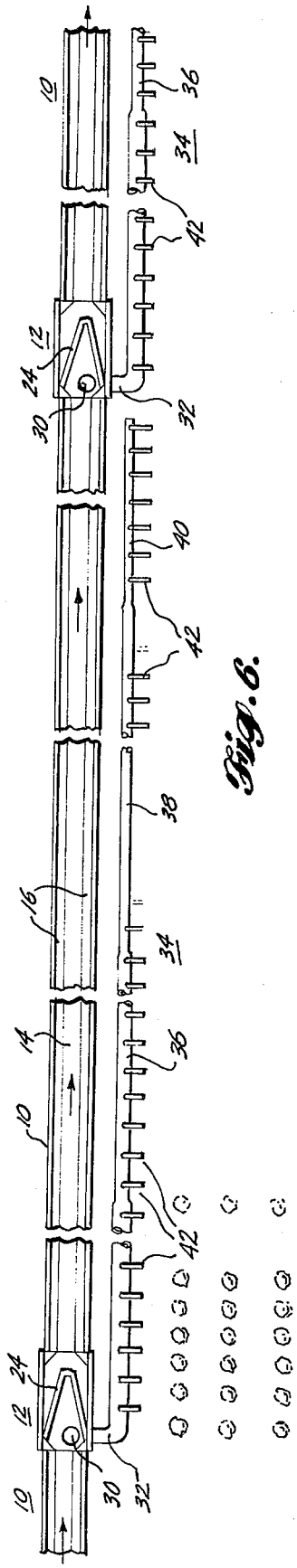
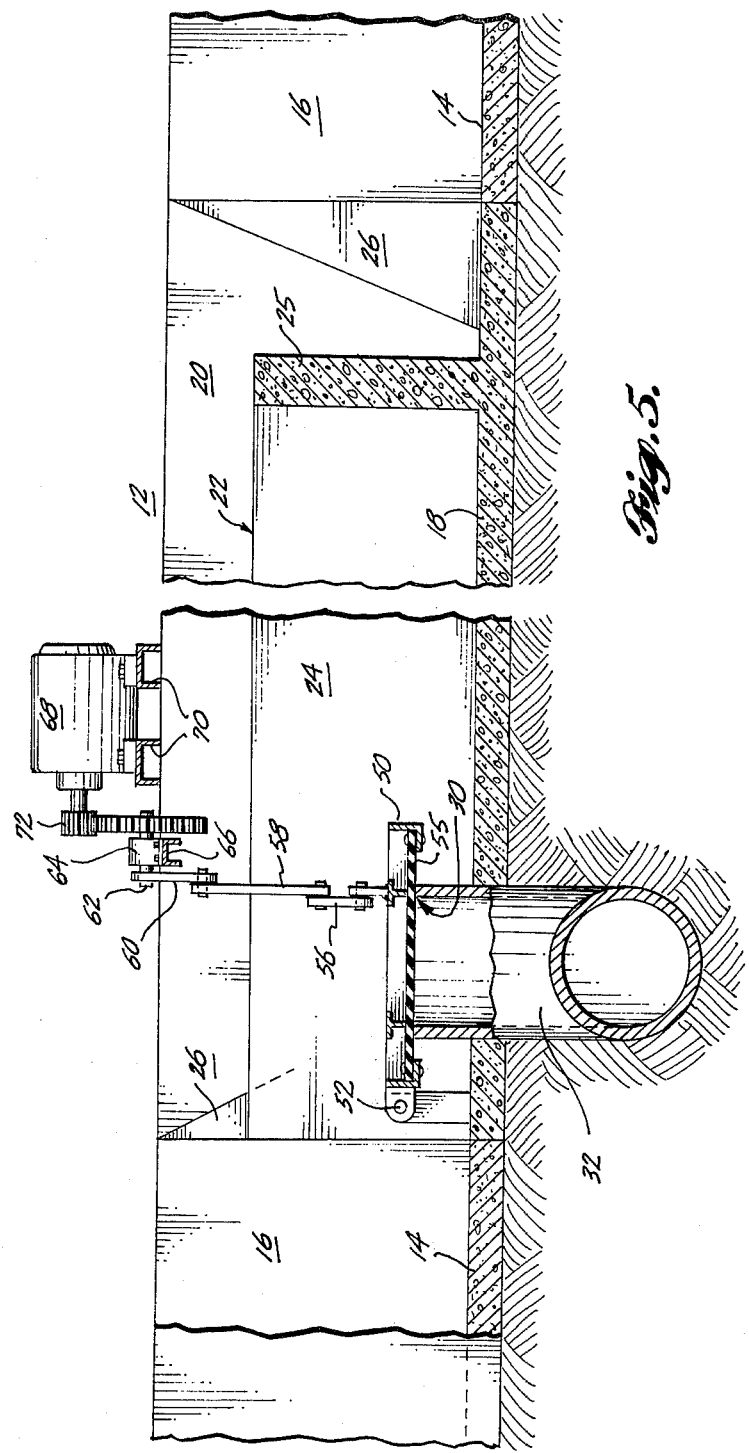

IRRIGATION CANAL, WATER-WITHDRAWAL WEIR

BACKGROUND OF THE INVENTION

A very real need has arisen for a system capable of permitting the withdrawal at one point in an irrigation canal of a substantial quantity of water and directing it to a plurality of field corrugations with minimal attention on the part of the irrigator. In the interests of reducing the requirement for personal attention by the irrigator, there is also need for a system capable of remotely located control means operable to actuate valved outlets from the canal for activating or deactivating the withdrawal means.

PURPOSES OF THE INVENTION

A main purpose of this invention has been the provision, in an irrigation system including a watertight canal or head ditch having a distributor conduit alongside, of an enlarged weir in the canal and containing a water-level-raising, bifurcated dam or water check operable to produce a withdrawal pool upstream of the weir and from which water may flow to a multiple-outlet distribution system and thence to numerous field corrugations.

Another purpose of this invention is to provide a valve means associated with the outlet from the basin which may be activated from a remote location and which is simple to construct and trouble-free in operation.

A still further purpose of this invention has been the design of a weir for inclusion in a canal system which weir is capable of pre-production and yet may be readily be fitted into a canal system being cast in place according to current practices.

A final purpose of this invention has been the provision of a system that can be adapted to flood and seep methods of irrigation.

These and other purposes will become more apparent during the course of the following more specific and detailed disclosure of a preferred form of the invention.

DESCRIPTION OF THE DRAWINGS

FIG. 5 is a longitudinal-sectional view taken on line 5—5 of FIG. 3; and

FIG. 6 is a schematic plan view of an irrigation system embodying the principles of this invention.

DESCRIPTION OF A PREFERRED EMBODIMENT

Figure 1:
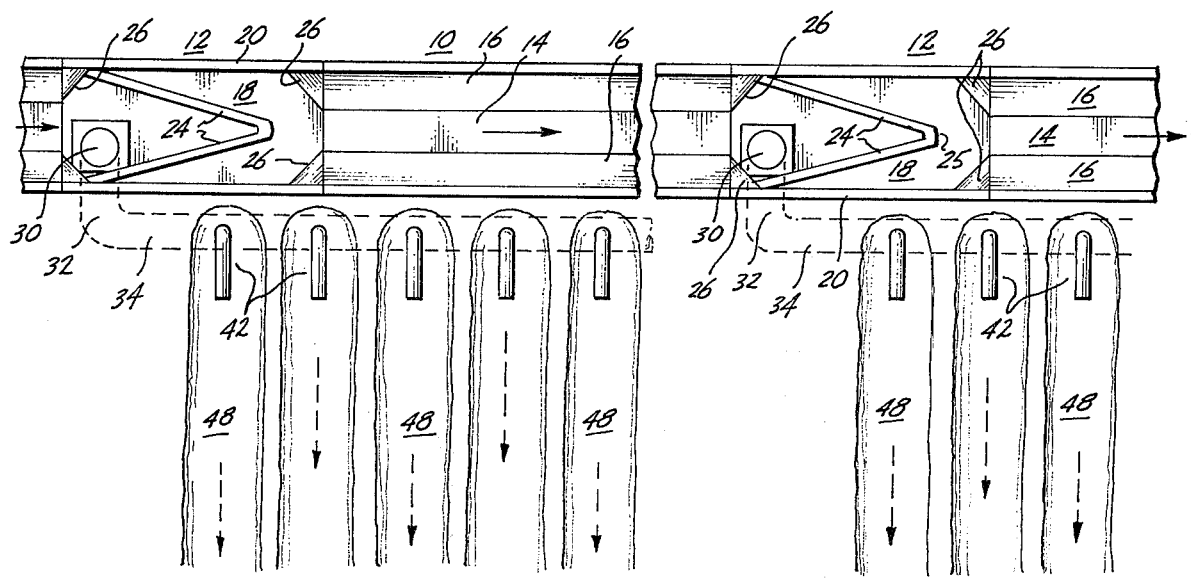
FIG. 1 is schematic plan view of an irrigation system embodying this invention.

FIG. 6 is schematically showing a typical irrigation system according to this invention. The elongated main or secondary canal 10 includes a plurality of weirs 12 spaced therealong. Usually canal 10 is a cast-in-place concrete structure having a flat bottom 14 and sloping side walls 16,16. It will be understood that canal 10 may extend from 100 to 300 feet between weirs 12 somewhat as dictated by terrain, water supply and related factors. A typical canal, for example, will comprise sections of about 200 to 225 feet between the weirs. In some instances, canal 10 may be formed of several end-joined pre-cast sections. Or it may be an earthen ditch lined with a non-porous sheet of plastic or similar water-containing sheet material.

Each Weir 12, preferably rectangular pre-cast concrete structure, is open-ended and comprises bottom 18 and upright side walls 20,20. Rising above said bottom is a bifurcated dam or water check 22 comprising converging walls 24,24 that meet and join at 25 in the downstream direction to form a vee-shaped dam in the weir. Walls 24,24 rise from weir bottom a height less than the height of the weir 12 which is, of course, established by side walls 20,20. In general weir 12 is rectangular in cross-section. To adapt the ends of the rectangular weirs 12 to the tapered canal 10, the transition fillets 26 are provided at the ends of the weir units making them conform to the cross-section of the canals.

Figure 2:
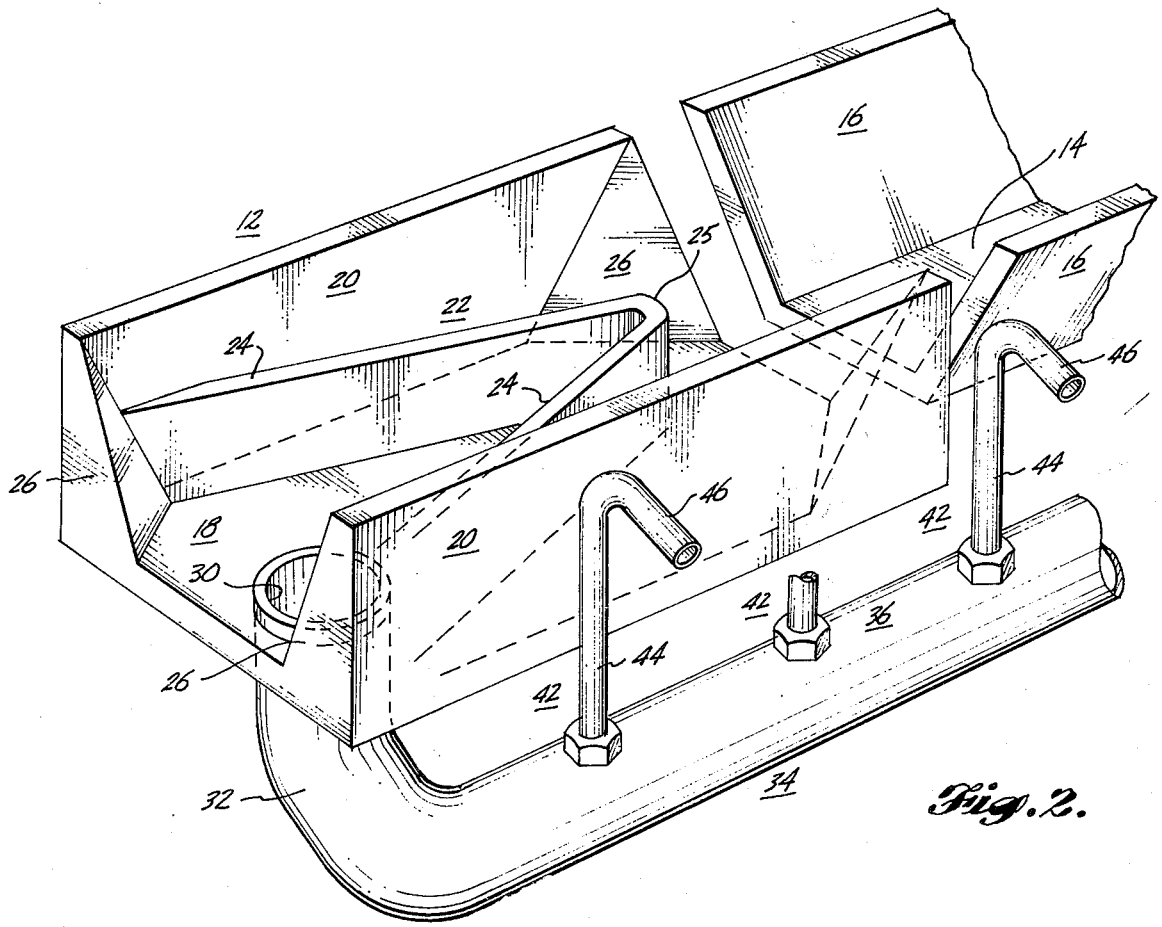
FIG. 2 is a perspective view of a weir and its bifurcated water check or dam used in said system.
Figure 3:
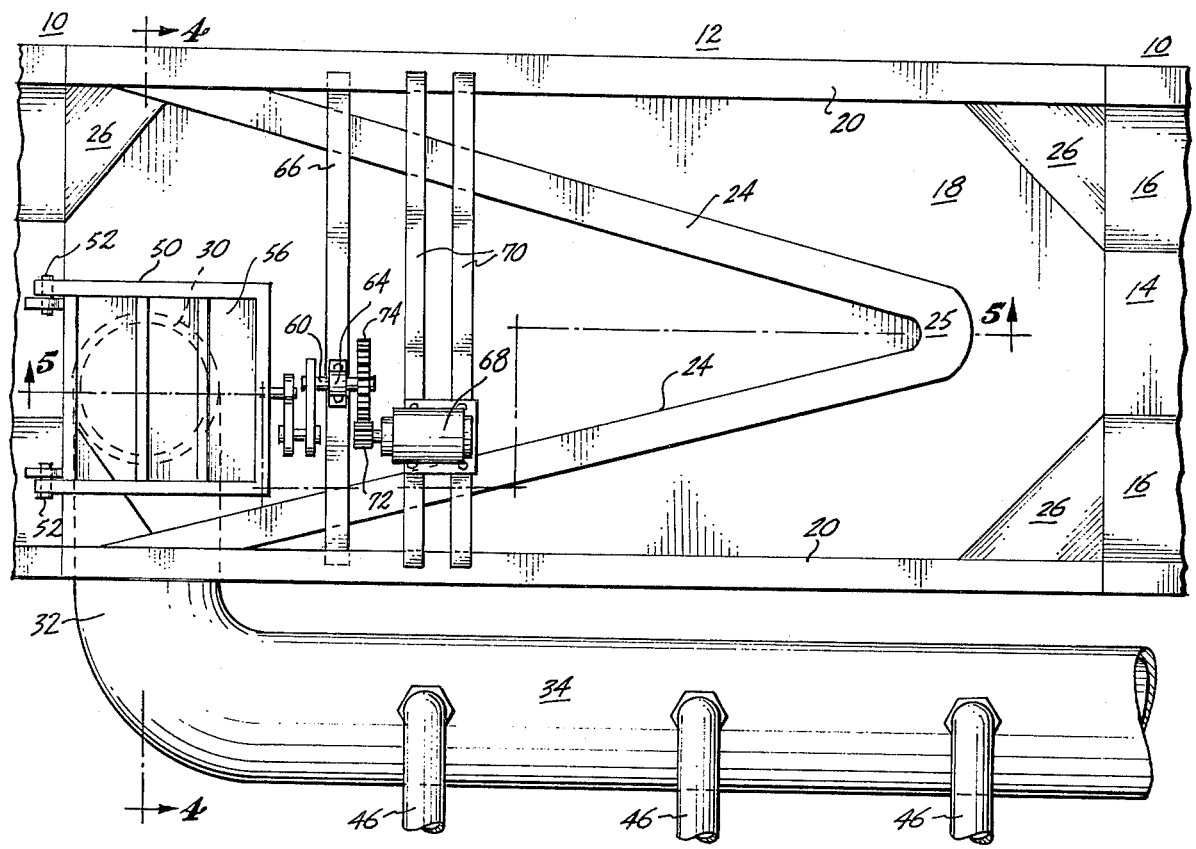
FIG. 3 is an enlarged plan view of the weir as installed in an irrigation system.
Figure 4:
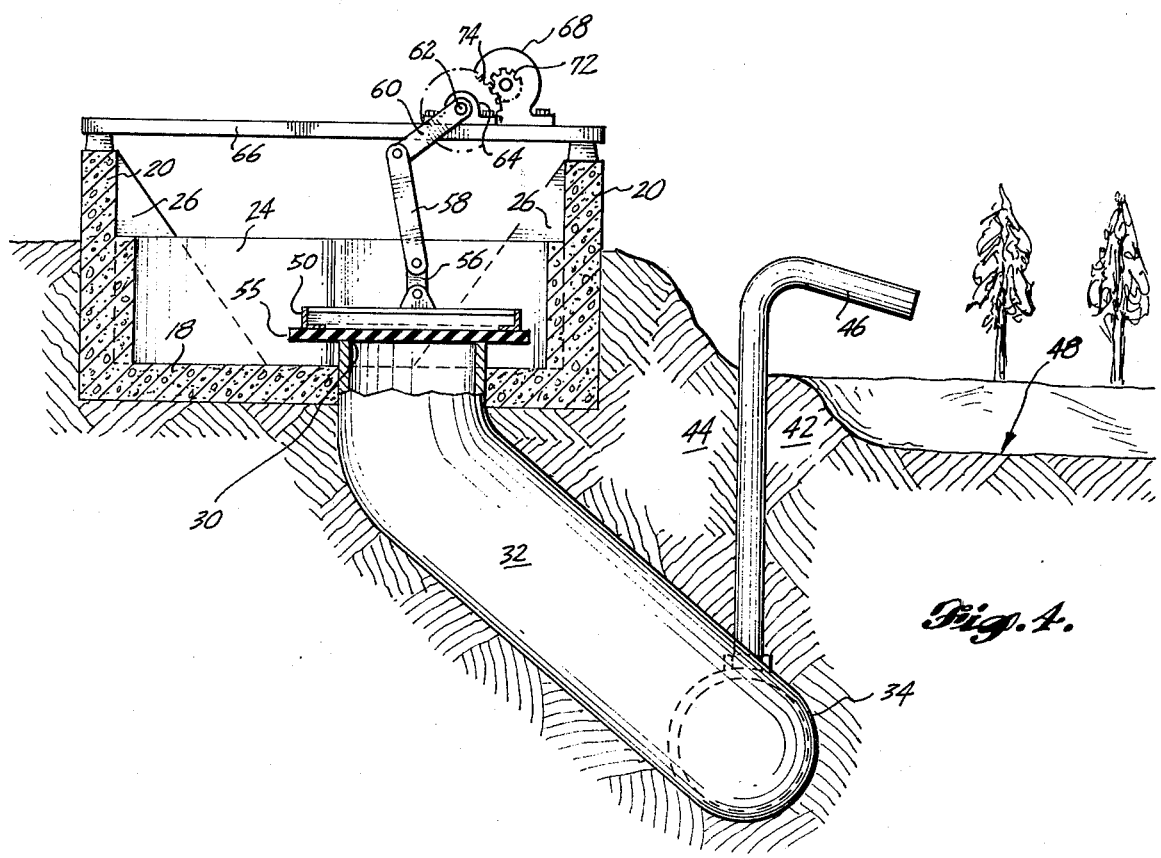
FIG. 4 is a cross-sectional view taken on line 4—4 of FIG. 3.

The bifurcated or vee-shaped water check 22 in each weir functions to retard water flowing down the upstream canal 10 and cause it to pool in the weir 12 in the crotch of the water check. Each weir 12 in its bottom 18 has an outlet 30 located upstream of the water check or dam 22. Outlet 30 is part of conduit 32 which descends into the earth beneath weir 12 coursing generally in a lateral direct to one side of the weir where it merges with the distributor conduit 34 as best seen in FIGS. 2, 3 and 4. Distributor conduit 34 extends alongside canal 10 at a level lower than the canal and usually beneath the ground surface. Such a conduit may, as shown in FIG. 6, be a longitudinal assembly of progressively reduced tubular sections 32, 36, 38 and 40 or more. For example, the diameters of section 32 may be 10 inches; of section 36, 8 inches; of section 38, 6 inches; and of section 40, 4 inches.

Each of the sections of the distributor conduit 34 is provided with a plurality of spaced-apart outlet tubes 42 each of which comprises a riser 44 and a nozzle 46.

Extending laterally of the canal 10 it is customary to form a plurality of porous earthen ditches or rills 48 usually disposed between rows of vegetation to be irrigated as shown in FIG. 6. An outlet tube 42 is provided for each such ditch 48.

As best seen in FIGS. 3, 4 and 5, the weir openings 30 comprise a portion of tube 32 standing slightly above the weir bottom 18. A structurally simple valve for each opening 30 comprises a rectangular frame 50 hinged at 52 to uprights rising in the weir adjacent opening 30. Flexible and pressure adaptable web 55 is supported at its edges by frame 50 and overlies opening 30. To permit water to flow out of the weir 12 through opening 30 frame 50 is raised by a mechanical system comprising links 56,58, and crank arm 60 on shaft 62. Shaft 60 is journalled in bearing 64 supported by cross bar 66 which spans weir 12. Motor 68, similarly supported on cross-bars 70, through gears 72,74 activates shaft 62 to produce rotation of crank arm 60. By such means the hinged valve member is raised and lowered to open or close the distributor conduit system. Motor 68 may be remotely controlled.

In ditch or rill irrigation it is important and often a great problem to supply the many ditches 48 with equal portions of water. In the system described herein water is caused to pool in a weir 12 as a function of the vee-shaped dam or water check formed by walls 24,24. The opening 30 is in the bottom of such a pool. When the valve means 56 is raised, water rapidly flows out to the several distributor sections 32, 36, 38 and 40, and from them rises and is discharged in ditches 48 through the numerous individual outlet tubes 42. The stepped-down or reduced dimensions of the distributor sections 32, 36, 38 and 40 in part meter and evenly spread the water flow along the length of the composite distributor tube 34. By predetermining the length of each of the sections and the number of outlets from each section it is possible to insure that the water-flow from each outlet is close to that of all other outlets. As an example, if section 32 is 10 inches in diameter and 87.5 feet long it can support 28 outlet tubes 42; when section 36 is 70 feet long and has 28 tubes; and section 38 is 50 feet long and has 20 tubes; and section 40 is 12.5 feet long and serves five tubes.

Normally the flow of water in canal 10 and into a weir 12 will be such that when valve 55 is raised and opening 30 unobstructed, the entire flow will be diverted into the elongated distributor 34 and, as described, evenly delivered to the many outlets 42 and their related ditches 48. Under such circumstances there would of course be no flow over the water-check 24. When it has been determined that an area under irrigation has received a suitable portion of water, valve 55 will be closed in one weir, and the companion valve 55 in the next adjacent weir will be opened and the field section served thereby will begin receiving water.

In some respects this system is related to the invention of my U.S. Pat. No. 3,630,034 issued Dec. 28, 1971. It differs primarily in the inclusion of the progressively reduced distributor conduit and the weir or basin construction including the water-check to retard and pool water to create head pressure above outlet 30 to insure a uniform and forceful flow into distributor 34. It will also be observed that in the instant system valve 55 may be only partially opened, in which case the upstream pool created by water-check or dam 24 will not be fully drawn off and an excess will occur. In this case the excess will overflow the dam 24 and pass on downstream to the next weir where it may be distributed as described.

The vee-shaped water-check 24 provides a maximum of lip over which water may flow. In a situation where the upstream canal 10 is delivering a full flow of water and valve 55 is closed it is necessary, to avoid spillage, for a weir and its dam to pass a great amount of water to avoid spillage or backing-up. With the cross-section of the weir 12 appropriately proportioned vis a vis the cross-section and head of water of the canal an even flow may be maintained throughout the system.

In addition to ditch or rill irrigation, this system is adaptable to flood irrigation and seep irrigation. In the flood system it is possible to dispense with the distributor conduit 34 in which case all water passing out of a weir 12 via its opening 30 is allowed to flow or flood over the adjacent land. In using this system for seep irrigation the risers 44 of the distribution conduit are omitted and the distributed water flows out of the many underground openings of the conduit and seeps and percolates through the earth. This system is adaptable with various other irrigation schemes as well.

In compliance with the statute, the invention has been described in language more or less specific as to structural features. It is to be understood however, that the invention is not limited to the specific features shown, since the means and construction herein disclosed comprises a preferred form of putting the invention into effect. The invention is, therefore, claimed in any of its forms or modifications within the legitimate and valid scope of the appended claims, appropriately interpreted in accordance with the doctrine of equivalents.

What is claimed is:

1. For use in an irrigation system in which, alongside a substantially water-tight canal, there is a distributor conduit having a plurality of spaced-apart tubes, each associated with a field corrugation and operable to withdraw and direct water from said conduit to flow as a rill in the associated corrugation, the improvement, comprising:
   wall means forming a weir in such canal adjacent the upstream end of said distributor conduit, said weir having an enlarged cross-section relative the cross-section of said canal;
   a bifurcated vee-shaped water check pointed downstream in said weir and formed of walls rising from the bottom of said weir to a height less than the height of said weir, said bifurcated water check being operable to substantially retard the flow of water through said weir;
   said weir having a valved outlet in its bottom located adjacent the upstream end of said bifurcated water check;
   valve-actuating means operable to open and close said valved outlet to control water flow therethrough; and
   conduit means connecting between said outlet and said distributor conduit.

2. The invention according to claim 1 in which said bifurcated water check is Vee-shaped.

3. The invention according to claim 2 in which said bifurcated water check spans said basin from side-to-side.

4. The invention according to claim 1 in which said weir is U-shaped in cross-section.

5. The invention according to claim 4 in which said bifurcated water check is Vee-shaped and spans said weir from side-to-side.

6. In an irrigation system in which, in a canal, there is means to establish a water pool from which water is laterally withdrawn and diverted into an elongated tubular conduit means formed of a plurality of sections progressively reduced in cross-section, each section having a plurality of outlets each to serve an individual irrigating ditch, the improvement comprising:
   wall means forming a weir in said canal;
   a bifurcated vee-shaped dam in said weir pointed downstream and rising to a height less than the height of said weir; and
   a valved outlet from the weir upstream of said vee-shaped dam.

* * * * *